R. S. BRYANT.
VEHICLE WHEEL RIM.
APPLICATION FILED NOV. 13, 1914.
1,235,537.
Patented July 31, 1917.
2 SHEETS—SHEET 1.
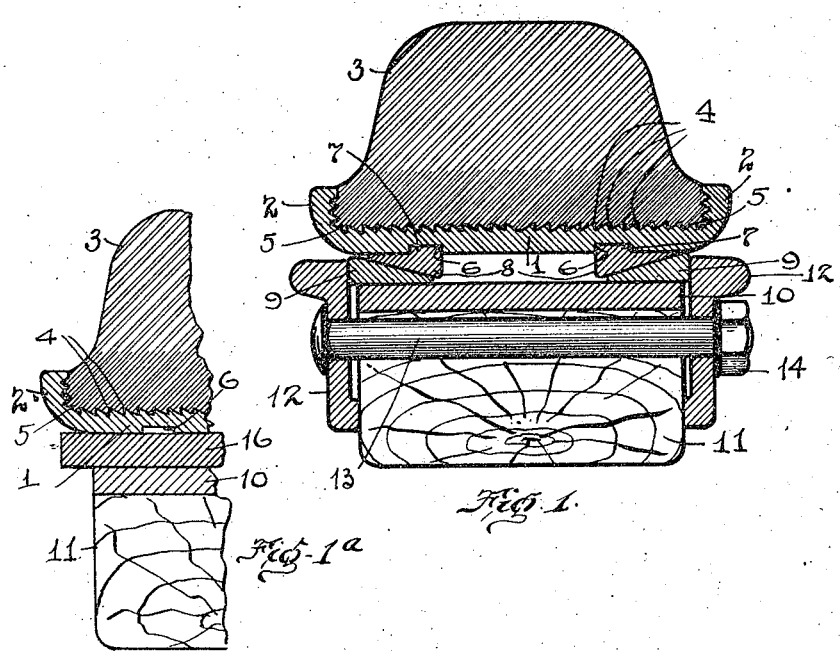
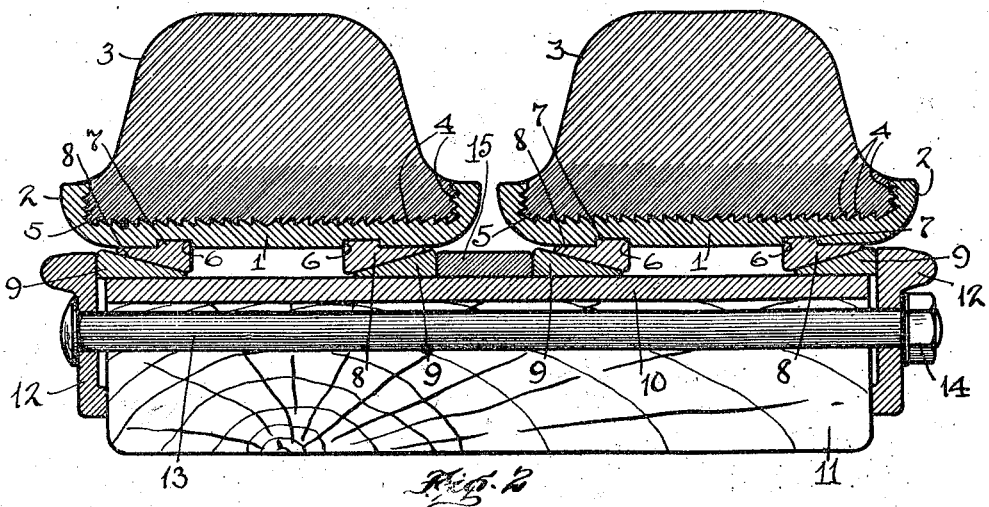
Witnesses
O. M. Kappler.
Thos. H. Fay
Inventor
Richard S Bryant
By Fay and Oberlin
Attorneys

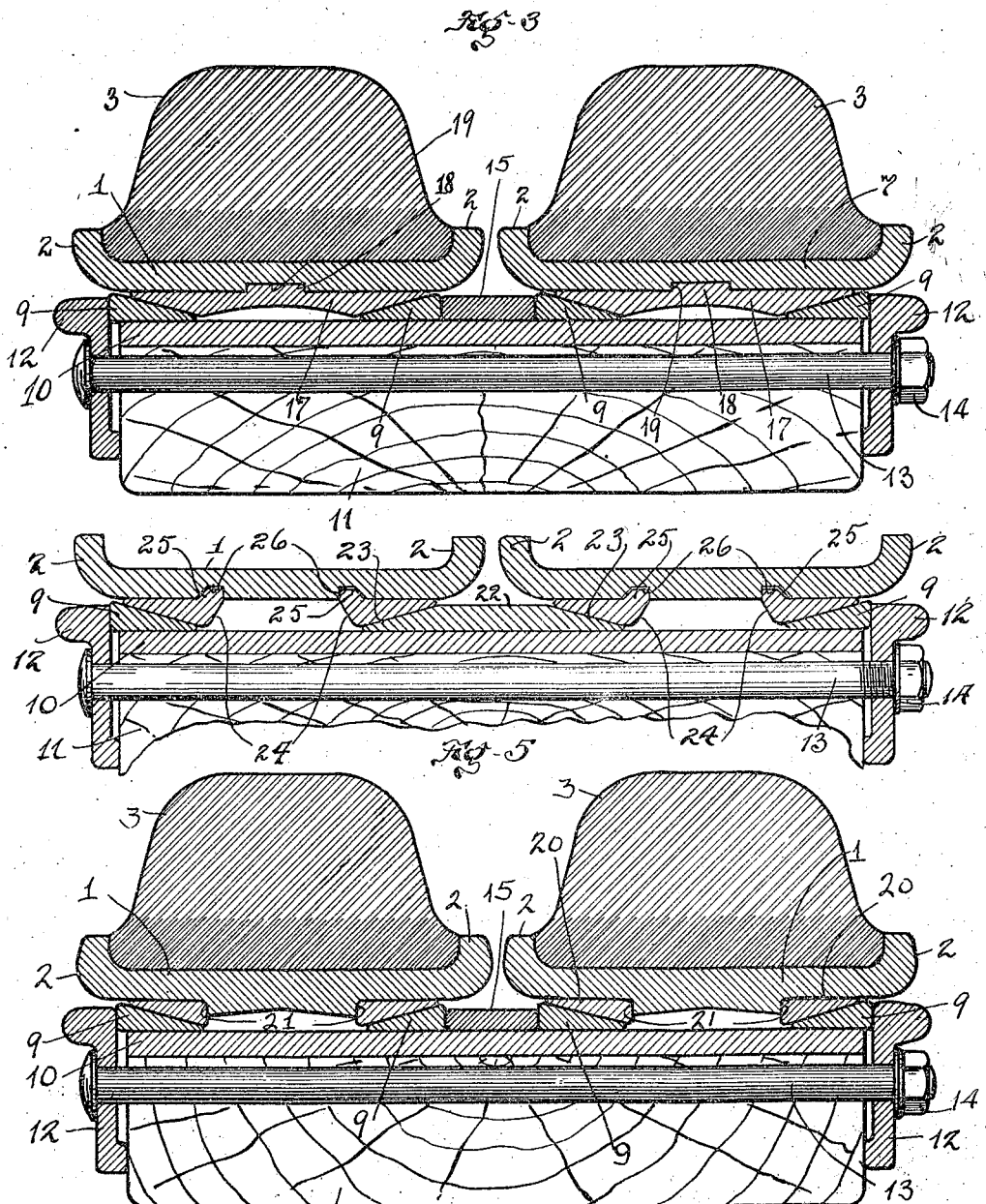

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

VEHICLE-WHEEL RIM.

1,235,537.   Specification of Letters Patent.   Patented July 31, 1917.

Application filed November 13, 1914. Serial No. 871,910.

*To all whom it may concern:*

Be it known that I, RICHARD S. BRYANT, a citizen of the United States, and a resident of Cleveland, county of Cuyahoga and State of Ohio, have invented a new and useful Improvement in Vehicle-Wheel Rims, of which the following is a specification, the principle of the invention being herein explained and the best mode in which I have contemplated applying that principle, so as to distinguish it from other inventions.

In mounting so-called solid rubber tires on vehicle wheels, an increasingly popular method has been to directly vulcanize the base of the tire onto the metal band or rim, which may then be either permanently secured, or pressure-fitted, onto the felly of the wheel, or may be demountably secured onto such wheel felly in order to permit of the more convenient interchange and replacement of the tires. The present improvements relate more especially to rims for solid tires designed to be thus demountably secured onto the wheel, although certain features of construction embodied in such improvements may be also utilized in connection with rims of this kind, irrespective of how they are mounted on the wheel.

The object of the invention is to provide a simple and inexpensive form of locking device for demountably securing such rims on the wheels, and particularly solid tire rims of the kind in question, while still leaving such rims of a form and construction adapting them to be pressure-fitted to the wheel if desired. At the same time the locking means are equally adaptable for use on single or dual tread wheels. A further object of the invention is to provide a rim with its outer face so formed as to insure that the tire base will firmly adhere thereto and not work loose, despite of vulcanization. To the accomplishment of the foregoing and related ends, the invention, then, consists of the means hereinafter fully described and particularly pointed out in the claims.

The annexed drawings and the following description set forth in detail, certain mechanism embodying the invention, such disclosed means constituting, however, but one of various mechanical forms in which the principle of the invention may be used.

In said annexed drawings:—

Figure 1 is a transverse sectional view of the felly of a single tread wheel, showing a solid-tire rim embodying my improved construction together with my improved device for demountably securing such rim in place; Fig. 1ª illustrates, in similar cross-section, the arrangement where such rim is pressure-fitted onto the felly; Fig. 2 is a section similar to that of Fig. 1, but illustrating the arrangement in the case of a dual tread rim, where two rims are demountably secured on the wheel felly; Fig. 3 is a view of a dual tread wheel similar to that of Fig. 2, but showing a modification in the construction of the rims and securing means therefor; and Figs. 4 and 5 are likewise views similar to Fig. 2, but showing still other modifications in construction.

The tire-supporting rims 1 in the case of each of the several different constructions illustrated in the aforesaid drawings, are provided with lateral up-turned flanges 2 to incase the sides of the tire-base, and it will be understood that the tread portion of the tire 3 may take on any desired form both in transverse and longitudinal cross-section, the transverse section shown being merely typical; it will also be understood that the bases of such tires are vulcanized directly onto the supporting rims, the base portion of the tire being usually less resilient than the body and tread.

The outer face of the rim, to which the tire is thus vulcanized, may be simply plain, as illustrated in Figs. 3 and 4, but preferably and usually, such face is serrated, that is, provided with a plurality of circumferential grooves 4, (Figs. 1 and 2), thus increasing the area of contact between the base of the tire and the rim, and also affording a better grip, or hold, for the tire. In the construction of rim illustrated in Figs. 1 and 2, I illustrate serrations of this kind, such serrations, however, being disposed in a particular manner, thereby materially increasing their utility. Thus it will be observed that not merely is the base serrated, but also the inner faces of the up-turned side flanges, the serrations on the outer face proper, of the rim, being of saw-tooth form with the teeth pointing in opposite directions from a median line. The effect of the one set of serrations accordingly is opposite to that of the other, in this way more securely retaining the tire in place, while in the corners of the rim a dove-tail recess 5 is formed which additionally assists in binding the lateral edges of the base firmly to the rim.

Regarding next, those features of construction adapting the rim to be secured on the wheel body, or wheel proper, in the form illustrated in Figs. 1 and 2, it will be observed that the inner face of the rim is provided with two circumferential grooves 6 adapted to receive corresponding tongues 7 on wedge-rings 8 which are transversely split, and possess sufficient resilience to normally be retained in such grooves. Adapted to coöperate with the wedge-rings, thus detachably secured to the tire-supporting rims, are two complementary wedge-rings 9, which seat directly on the outer face of the fellyband 10, that surrounds the felly 11 proper, as usual. These two last-named wedges are adapted to be forced inwardly by two clamping flanges 12, that are secured against the respective faces of the felly by means of transverse bolts 13, having nuts 14, adapted to draw such flanges together. The latter may either be complete annuli, or of segmental construction, and project radially above the felly-band 10 a sufficient distance to engage the aforesaid wedge-rings 9 without interfering with the tire-supporting rim 1.

Where, as shown in Fig. 2, two rims require to be mounted on the felly, a plain continuous ring 15 is simply inserted between the wedges 9 disposed to coöperate with the two inside wedge-rings 8 carried by the respective rims. It will be obvious that by drawing together the flanges 12, the wedging action will be distributed between all four wedge-rings, thus simultaneously securing both rims on the wheel.

Where it is desired to pressure-fit the rim onto the felly, a plain annular band 16 (Fig. 1ª) is simply inserted between the tire-supporting rim 1 and the felly-band 10, such band being of such thickness as to require considerable force to be thus inserted.

By reason of the fact that the wedge-rings 8 are detachable from my improved tire supporting rims, it will be obvious that the latter may be readily prepared to be thus pressure-fitted without requiring any special machining; in other words they are strictly interchangeable for both methods of mounting, a feature of high importance, not merely in the hands of the user, who may desire to use a spare rim on either of the two types of wheel, but also to the manufacturer, who is not required to maintain a duplicate stock.

The construction illustrated in Fig. 3 differs from that shown in the first described figures only in that instead of a pair of wedge-rings 8 detachably secured to the inner face of the tire-supporting rim, a single band 17 having its edges oppositely beveled, is thus secured by being formed with a tongue 18 adapted to fit into a correspondingly disposed groove 19 in the inner face of the rim. The coöperating wedge-rings 9, side-flanges 12 and intermediate plain ring 15, where a dual arrangement is desired, are exactly the same as in the previously described construction. The rims are here equally well adapted to be pressure-fitted instead of detachably wedged onto the wheel felly.

The construction of rim in Fig. 4, on the contrary, is not thus adapted for interchangeable use, but still retains the feature of separable wedge-rings 20 on the inner face of the tire supporting rim for providing the co-acting beveled surface for the wedge-rings mounted on the felly-band. These wedge-rings 20, however, do not have tongues adapted to fit into grooves on the face of the rims, but simply abut against integral shoulders 21 thereon. The arrangement of parts otherwise is the same as in the preceding construction.

In Fig. 5, the principal modification consists in the utilization of a single center ring 22, instead of two wedge rings, such as rings 9, with an interposed plain ring 15. The outer lateral edges 23 of said ring 22 are beveled to coöperate with the inclined faces of the beveled ribs on the inner face of the tire-supporting rim, whether said ribs be of the kind shown in Figs. 1 and 2, Fig. 3, or Fig. 4. The specific form however, of the ribs 24 illustrated in Fig. 5 corresponds most nearly with that of the ribs 8 in said Figs. 1 and 2, differing therefrom only in that the tongues 25 thereon slant at an angle to the body of the ring, so as to materially strengthen such rib, that is render it less likely to be broken off than when it projects at a right angle. The grooves 26 in the inner face of the rim will, of course, correspond in cross-section with the changed cross-section of such tongues.

The foregoing constructions of rim and particularly those illustrated in Figs. 1, 2 and 3, in addition to being interchangeable in the fashion above described, it should be noted, are capable of being fashioned out of plain bands, that is, they do not require to be rolled "special", so as to provide the integral wedge elements such as form the necessary feature of construction in solid-tire rims at present on the market. The necessity for cutting away metal in order to face such wedges, is also eliminated. The paired-wedge-rings used at both sides, may obviously be made identical so as to be interchangeable and adaptable for use with all profiles. It will accordingly be seen that both in construction and use, a marked simplification is found in the present rim.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle wheel, the combination with the wheel body; of a tire-supporting rim adapted to fit loosely on said body; two pairs of transversely-split, complementary wedge-rings interposed between said body and rim, one pair adjacent each side of the latter; and means adapted to simultaneously force both pairs of wedge-rings together.

2. In a vehicle wheel, the combination with the wheel body; of a tire-supporting rim adapted to fit loosely on said body; two pairs of transversely-split, complementary wedge-rings interposed between said body and rim, one pair adjacent each side of the latter, the outer ring of each pair engaging said rim so as to be held against transverse movement relatively thereto in one direction; and means adapted to simultaneously force inwardly the inner rings of such pairs.

3. In a vehicle wheel, the combination with the wheel body; of a tire-supporting rim adapted to fit loosely on said body; two pairs of transversely-split, complementary wedge-rings interposed between said body and rim, one pair adjacent each side of the latter, the outer ring of each pair engaging said rim so as to be held against transverse movement relatively thereto in either direction; and means adapted to simultaneously force inwardly the inner rings of such pairs.

4. In a vehicle wheel, the combination with the wheel body; of a tire-supporting rim adapted to fit loosely on said body; two pairs of transversely-split, complementary wedge-rings interposed between said body and rim, one pair adjacent each side of the latter, the outer ring of each pair detachably engaging said rim so as to be held against transverse movement relatively thereto in either direction; and means adapted to simultaneously force inwardly the inner ring of such pairs.

5. In a vehicle wheel, the combination with the wheel body; of a tire-supporting rim adapted to fit loosely on said body; two pairs of transversely-split, complementary wedge-rings interposed between said body and rim, one pair adjacent each side of the latter; flanges on the respective sides of said body adapted to press against the inner wedge-rings of each pair; and means adapted to draw said flanges toward said body.

6. In a vehicle wheel, the combination with the wheel body; of a tire-supporting rim adapted to fit loosely on said body; two pairs of transversely-split, complementary wedge-rings interposed between said body and rim, one pair adjacent each side of the latter, the outer ring of each pair detachably engaging said rim so as to be held against transverse movement relatively thereto in either direction; flanges on the respective sides of said body adapted to press against the inner wedge-rings of each pair; and means adapted to draw said flanges toward said body.

7. In a vehicle wheel, the combination with the wheel body; of a plurality of tire-supporting rims adapted to fit loosely on said body; two pairs of transversely-split, complementary wedge-rings interposed between said body and each of said rims, one pair adjacent the respective sides of the latter; and means adapted to simultaneously force all of said pairs of wedge-rings together.

8. In a vehicle wheel, the combination with the wheel body; of a plurality of tire-supporting rims adapted to fit loosely on said body; two pairs of transversely-split, complementary wedge-rings interposed between said body and each of said rims, one pair adjacent the respective sides of the latter; a continuous plain ring disposed between the inner wedge-rings of the respective inside pairs; and means adapted to simultaneously force inwardly the inner wedge-rings of the respective outside pairs.

9. In a vehicle wheel, the combination with the wheel body; of a plurality of tire-supporting rims adapted to fit loosely on said body; two pairs of transversely-split, complementary wedge-rings interposed between said body and each of said rims, one pair adjacent the respective sides of the latter; a continuous plain ring disposed between the inner wedge-rings of the respective inside pairs; flanges on the respective sides of said felly adapted to press against the inner wedge-rings of the corresponding outside pairs; and means adapted to draw said flanges together.

10. In a vehicle wheel, the combination with the wheel body having a substantially cylindrical outer face; of a tire-supporting rim adapted to fit loosely on said body, said rim having a circumferentially extending groove in its inner face near each side thereof; two pairs of transversely-split, complementary wedge-rings interposed between said body and rim, the inner of such wedge-rings slidably contacting with said body and the outer thereof each having a tongue adapted to engage one of the grooves in said rim; and means adapted to simultaneously force said two inner wedge-rings together.

11. In a vehicle wheel, the combination with the wheel body having a substantially cylindrical outer face; of a tire-supporting rim adapted to fit loosely on said body, said rim having a circumferentially extending groove in its inner face near each side thereof; two pairs of transversely-split, complementary wedge-rings interposed between said body and rim, the inner of such wedge-rings slidably contacting with said body and the outer thereof each having a tongue adapted to engage one of the grooves in said rim; flanges on the respective sides of said body adapted to press against said two inner wedge-rings to force the same together; and means adapted to draw said flanges toward said body.

Signed by me, this 10 day of November, 1914.

RICHARD S. BRYANT.

Attested by—
D. T. DAVIES,
JNO. F. OBERLIN.